United States Patent [19]
Wehler et al.

[11] Patent Number: 5,863,163
[45] Date of Patent: Jan. 26, 1999

[54] COVER FOR A MACHINE BED

[75] Inventors: Herbert Wehler, Neunkirchen; Roland Müller, Siegen, both of Germany

[73] Assignee: Kabelschlepp GmbH, Siegen, Germany

[21] Appl. No.: 894,816

[22] PCT Filed: Feb. 26, 1996

[86] PCT No.: PCT/EP96/00779

§ 371 Date: Aug. 29, 1997

§ 102(e) Date: Aug. 29, 1997

[87] PCT Pub. No.: WO96/27478

PCT Pub. Date: Sep. 12, 1996

[30] Foreign Application Priority Data

Mar. 8, 1995 [DE] Germany ......................... 195 08 266.4

[51] Int. Cl.$^6$ ............................. B32Q 11/08; B23C 9/00; E05D 15/06
[52] U.S. Cl. ........................... 409/134; 160/202; 451/454
[58] Field of Search ........................... 409/134; 451/454; 160/202, 222, 223; 74/608; 82/173, 149

[56] References Cited

U.S. PATENT DOCUMENTS

| | | |
|---|---|---|
| 4,522,246 | 6/1985 | Bierbrauer et al. ..................... 160/223 |
| 4,860,917 | 8/1989 | Stöhr ..................................... 74/608 X |
| 5,119,869 | 6/1992 | Henning .................................... 160/202 |
| 5,156,195 | 10/1992 | Wehler et al. .......................... 160/202 |
| 5,570,979 | 11/1996 | Okamoto et al. ....................... 409/134 |

FOREIGN PATENT DOCUMENTS

| | | |
|---|---|---|
| 40 26 609 C1 | 8/1990 | Germany . |
| 42 14 118 A1 | 4/1992 | Germany . |
| 94 08 389 U | 5/1994 | Germany . |

*Primary Examiner*—William R. Briggs
*Attorney, Agent, or Firm*—Frohwitter

[57] ABSTRACT

The invention relates to a cover for a machine bed of a machine tool with covering boxes which can be pushed telescopically one inside another, wherein each covering box comprises a first and a second side wall and a top wall joined to the side walls. On at least one side wall an outwardly projecting catch is arranged for the next largest covering box, provided with a counter catch. The catch is configured in a profiled catch section arranged in a side wall. A shock absorbing element is arranged on the catch, which dampens the impact between the catch and the counter catch. Furthermore, a stop is provided on the profiled catch section, which can be brought into contact with a profiled catch section or a rear wall of the next-largest covering box. The stop serves to dampen the impact between two covering boxes.

15 Claims, 4 Drawing Sheets

COVER FOR A MACHINE BED

CONTINUATION STATEMENT

This application is a 371 of Application PCT/EP96/00779, filed on 26 Feb. 1996, which in turn claims foreign priority to German Application 195 08 266.4 filed 8 Mar. 1995.

BACKGROUND OF THE INVENTION

The invention relates to a cover for a machine bed of a machine tool with covering boxes which can be pushed telescopically one inside another.

A covering box for covers which can be telescopically lengthened and shortened for slideways on machine tools is known from DE 40 26 609 C1. The covering box has a top wall and two side walls arranged at right-angles to the top wall, which are directly or indirectly connected to an end wall of the box. The covering box further has catches arranged on the end wall, above the side walls, projecting outwards, for the next largest covering box which has a corresponding counter catch. Each side wall has a longitudinal notch or a longitudinal slit on its edge adjacent the end wall, through which the front end of the catch, which is connected in a removable manner to the end wall in the form of a bar, protrudes. The covering box is made from a one-piece sheet metal blank. The longitudinal notches or longitudinal slits are necessary for attaching the catch, in the form of a bar, to the box.

The manufacturing cost for a covering box of this type with a bar is relatively high. In order to ensure that the end wall of the box, on which the catch is fixed, is not bent by the forces occurring when the boxes are displaced, it is known from DE 40 26 609 to weld the end wall to the side walls. The welding procedure must be carried out very carefully as distortion of the covering box can result due to the heat created during welding. Such distortion of the covering box cannot be completely ruled out, so subsequent straightening of the covering box is necessary.

SUMMARY OF THE INVENTION

Proceeding from this state of the art, the object of the invention is to simplify the manufacturing of a covering box. This object is solved according to the invention by a covering box for a machine bed of a machine tool with covering boxes which can be pushed one inside another, wherein each covering box comprises a first side wall and a second side wall and a top wall connected to the side walls, and projecting outwards from a side wall at least one catch for the next largest covering box provided with a corresponding counter catch, wherein the catch is configured on a profiled catch section arranged on a side wall wherein the corresponding counter catch is arranged on a side wall of the next largest covering box.

The cover according to the invention for a machine bed of a machine tool with covering boxes which can be pushed telescopically one inside another is distinguished in that the catch is configured on a profiled catch section arranged on one side wall of the covering box. The manufacturing of a covering box, and thereby the cover, is simplified by this configuration of the covering box. The profiled catch section is preferably joined to a side wall of the covering box. The joining of the catch profile to the side wall can be done by screwing. Bores are configured in the side wall for this purpose, through which a screw can extend. According to an advantageous further development, it is proposed to provide the profiled catch section of the surface adjacent to the side wall with a T-shaped groove extending in the longitudinal direction of the profiled catch section, open on at least one end face. In the T-shaped groove, the head and the neck of a screw can be accommodated. When the profile section is mounted, the head lies on the covering box on the shoulders of the T-shaped groove. It is also possible to fit a nut into the T-shaped groove instead of the head. The advantage of the T-shaped groove can be seen in that regardless of the position of the bores in the side wall, a connection can be established with the profiled catch section. The forces affecting the catch during displacement of the covering boxes are transferred to the side wall by the screwing of the profiled catch section to the side wall. The conduction of the forces into the side wall has the advantage that no distortion, or very little distortion of the covering box occurs.

Advantageously, the catch is provided with a shock-absorbing element which is arranged on the surface of the catch. The impact between the catch and the counter catch of two boxes occurring during displacement is dampened by the shock absorbing element. Furthermore, the noise occurring during the impact is reduced. This is particularly important as such covers act as resonating bodies.

It is proposed to provide the profiled catch section with a groove for receiving the shock-absorbing element. The groove is preferably configured in the surface of the catch. The configuration of the groove has the advantage that a simple connection of the shock-absorbing element to the profiled catch section is produced. Furthermore, replacement of the shock-absorbing element is simple. A shock-absorbing element made from felt is preferred. Other substances are possible for the shock-absorbing elements. However, care should be taken that the shock-absorbing elements are not so crushed by the impacts occurring that they lose their shock-absorbing effect.

To further simplify the manufacturing of a covering box it is proposed to connect the rear wall of the covering box to the profiled catch section. The rear wall can be configured as a separate piece. The connection of the rear wall to the profiled catch section can be done by screwing or the like. It is proposed in this respect to the profiled catch section in the surface adjacent to the rear wall, with a T-shaped groove, open at at least one end face, extending in the longitudinal direction of the profiled catch section.

When the covering boxes of the cover are pushed one inside another, the profile section of one box comes into contact with the profile section or the rear wall of the next-largest box. To avoid the impact and the noise associated with it when the covering boxes are pushed together, it is proposed to arrange at least one stop on the profiled catch section, wherein the stop can be brought into contact with a profiled catch section or a rear wall of the next-largest covering box. The stop can be made from felt, like the shock-absorbing element. The stop per se dampens the impact between two covering boxes which have been pushed one inside another. Furthermore, the noise occurring when two boxes are pushed together is reduced by the stop. The stop can be a stop profile which engages in a stop groove configured in the profiled catch section. The stop groove can be T-shaped or a swallow-tail shape.

The profiled catch section can be prepared to the extent that it is already provided with a shock-absorbing element and a stop. If the covering box is to include a rear wall, these individual parts can be prepared together with the profiled catch section as an integral structure, and then joined to the covering box. In this way the assembly time for a covering box is reduced. The counter-catch is preferably a strip arranged on a side wall. The strip is preferably made from brass.

BRIEF DESCRIPTION OF THE DRAWINGS

Further features and advantages of the covering according to the invention will be explained with reference to the embodiments shown in the drawings.

It is to be noted, however, that the appended drawings illustrate only typical embodiments of this invention and are therefore not to be considered limiting of its scope, as the invention may admit to other equally effective embodiments.

DETAILED DESCRIPTION OF THE INVENTION

Figure 1:
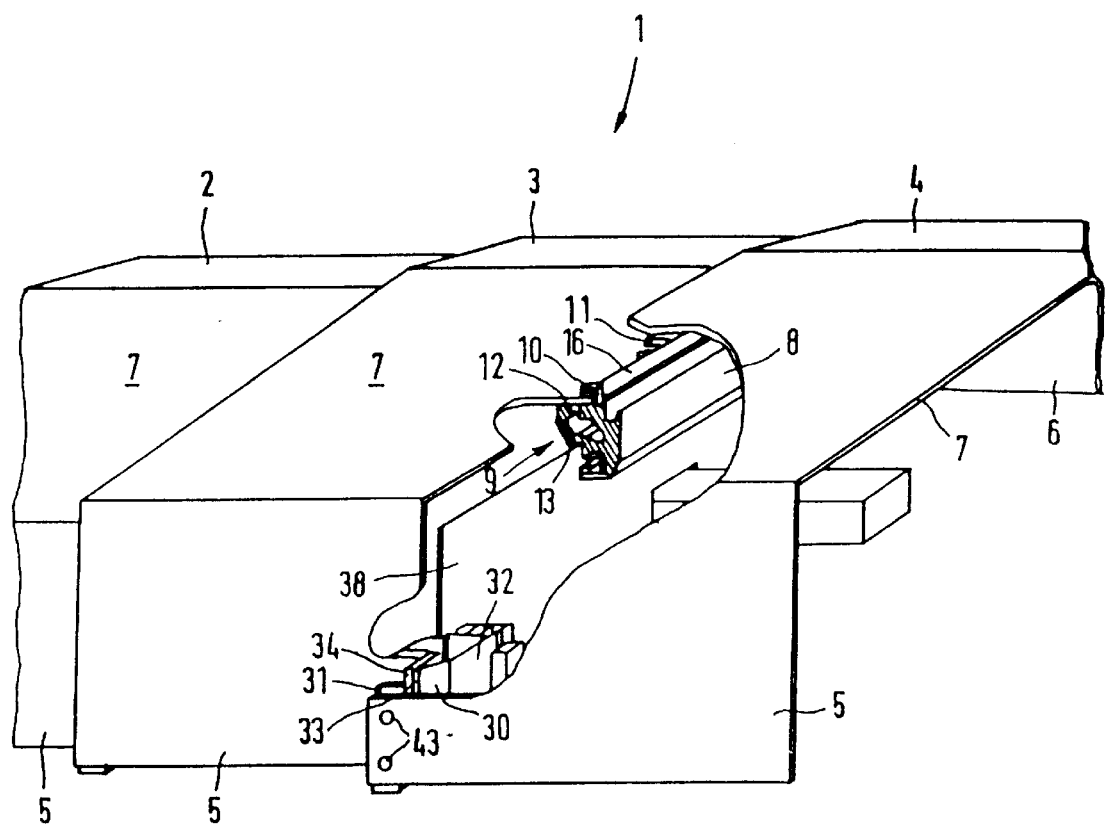
FIG. 1 is a schematic representation of a cover.

FIG. 1 is a schematic view of a cover 1 in perspective. The cover 1 includes covering boxes 2, 3, 4 which can be pushed telescopically one inside another. Each covering box 2, 3, 4 has a first and a second side wall 5, 6. A top wall 7, configured in the manner of a pitched roof, is connected to the side walls 5, 6. The side walls 5, 6 and the top wall 7 are made from a sheet-metal blank.

A profiled catch section 32 is arranged on the side wall 5. The profiled catch section 32 is provided with an outward projecting catch 30 for the next largest box 4 provided with a counter catch 31. A profiled catch section 32 is arranged on each side wall 5, 6 of a covering box 2, 3 and 4. As can been seen in FIG. 1, the profiled catch section 32 is connected to a rear wall 38.

Figure 2:
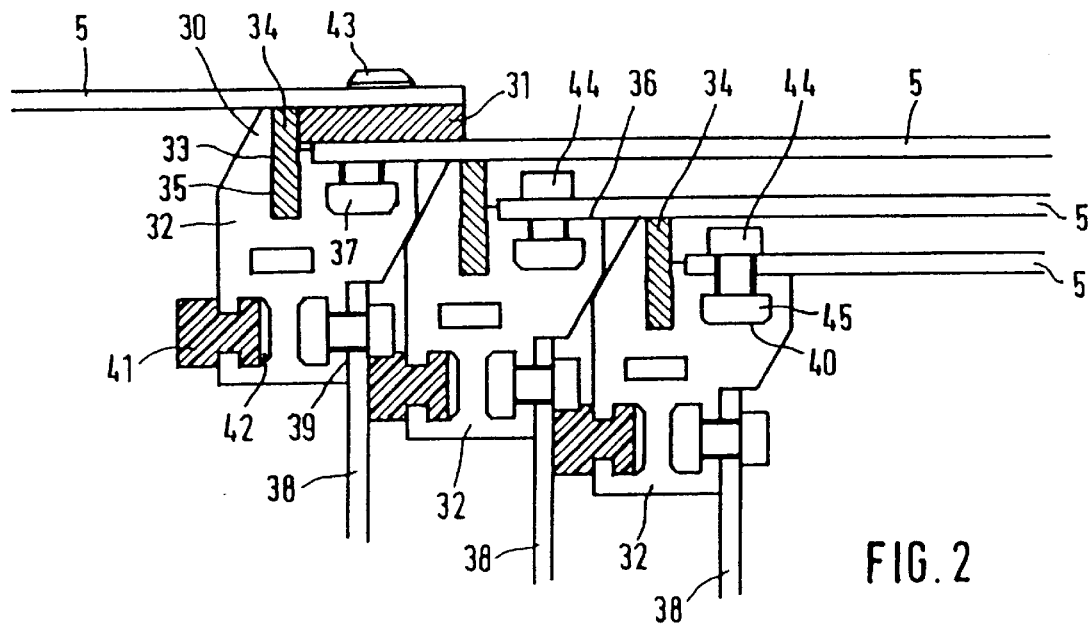
FIG. 2 is a first embodiment of a covering box in cross-section.

A shock-absorbing element 34 is arranged on the catch surface 33 of the catch 30. The shock-absorbing element 34 is inserted into a groove 35 configured in the profiled catch section 32. As can be seen in FIGS. 1 and 2, the counter catch 31 lies on the shock-absorbing element when the covering boxes 2, 3, 4 are pulled apart from one another. The counter catch 31 is connected to the side wall 5 of the next-largest covering box by means of a screw 43. The counter catch 31 can also be connected by means of a rivet instead of a screw 43. The counter catch 31 is configured in the form of a strip.

Each profile section 32 is connected to the side wall 5 by means of screws 44. The screw is screwed into a nut 45, which is arranged in a T-shaped groove 40. The T-shaped groove 40 is configured in surface of the profiled catch section 32 lying on the side wall 5.

If the covering boxes are pushed one inside another, a stop 41 lies on the rear wall 38 of the next-largest covering box. The stop 41 is arranged in a stop groove 42. The stop groove 42 extends in the longitudinal direction of the profiled catch section 32.

Figure 3:
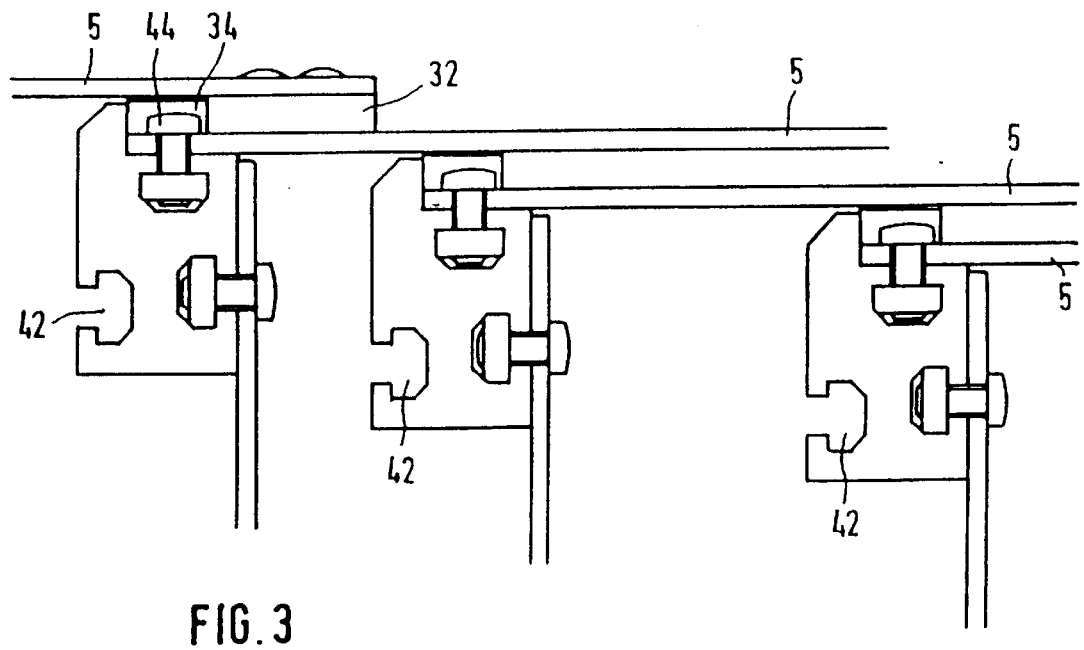
FIG. 3 is a second embodiment of a covering box in cross-section.

A second embodiment of a covering box is shown in FIG. 3. The profiled catch section 32 arranged on the side wall differs from the profiled catch section shown in FIG. 2 in that it is not provided with a groove for a shock-absorbing element 34.

The shock-absorbing element 34 is arranged on the side wall 5 by means of a screw 44.

We now return to FIG. 1. A profile section 8 is attached directly below the top wall 7.

The profile section 8 is connected to the top wall 7 by means of fixing means 10. The fixing means 10 are screws. A slider 11 is arranged on the upper side of the top wall 7. The underside of the top wall 7 of the next-largest covering box slides on the sliders 11. The sliders 11 are arranged at a distance apart from one another. They each extend over only a part of the width of the top wall 7, so that a fluid scraped off of the upper side of the top wall 7 can flow between the sliders 11 into the open channel 9. The sliders 11 can be made, for example, from brass, bronze or plastics. The sliders 11 are connected to the top wall 7 and the profile section 8 by means of the fixing means 10.

The top wall 7 is provided with brackets which are provided with bores through which the fixing means 11 extend. The free space around the brackets is connected to the open first channel 9.

Figure 4:
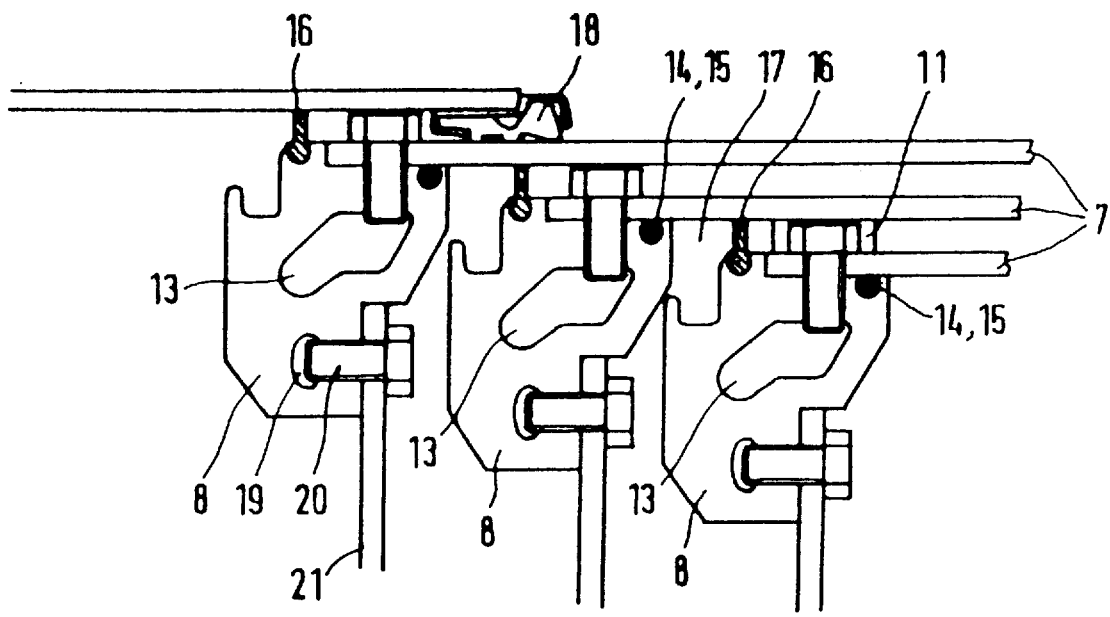
FIG. 4 is a longitudinal section of a profile section with a channel.
Figure 5:
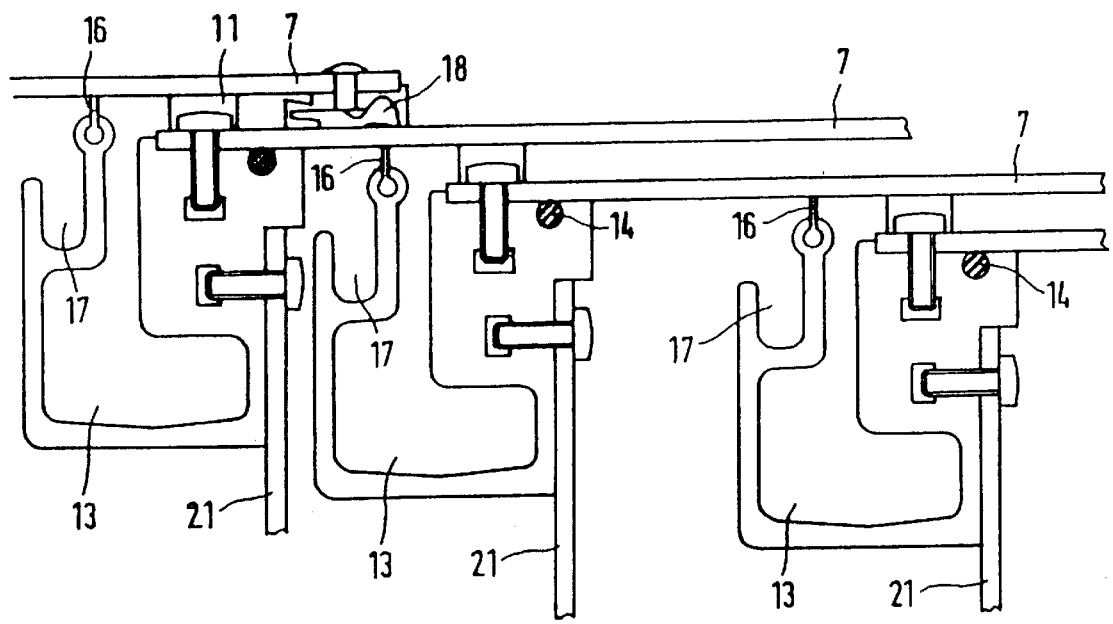
FIG. 5 is a longitudinal section of a second embodiment of a channel configured in the profile section.

The open first channel 9 is configured in the profile section 8. The first channel 9 is provided with a substantially rectangular intake section 12 which opens out into a collection channel 13. As can be seen in FIGS. 1 and 4, external threads are configured in the intake area 12 into which the screws are screwed.

A gasket 14 is arranged between the underside of the top wall 7 and the profile 8, which is inserted into a groove 15. The groove 15 is configured in the profile section 8.

A scraper 16 is arranged following the first open channel 9, which lies on the underside of the top wall 7 of the next-largest covering box 2, 3, 4. The profile section is provided with a second channel 17, wherein the scraper 16 is arranged between the first channel 9 and the second channel 17.

A scraper 18 is provided on the end of the top wall 7 opposite the profile section 8, which scraper slides on the upper side of the top wall 7 of the next-smallest covering box, and scrapes off the fluid and/or shavings found there.

A groove 19 is configured in the profile section 8, in which screws 20 are screwed. The screws 20 hold a rear wall 21, 38 onto the profile section 8. Instead of the groove 19, separate bores for screws 20 can be provided in the profile 8.

While the particular embodiments for a cover as herein shown and disclosed in detail are fully capable of obtaining the objects and advantages herein before stated, it is to be understood that they are merely illustrative of the presently preferred embodiments of the invention and that no limitations are intended by the details of construction or design herein shown other than as described in the appended claims.

What is claimed is:

1. A cover for a machine bed of a machine tool, said cover comprising a plurality of covering boxes which can be pushed one inside another, wherein each covering box comprises:

first and second side walls;

a top wall connected to said first and second side walls;

at least one catch which projects outwards from a side wall for catching a next largest covering box, wherein said at least one catch is configured on a profiled catch section arranged on a side wall, wherein said at least one catch comprises a catch surface on which a shock-absorbing element is arranged, wherein the profiled catch section comprises a side wall engagement surface, wherein the side wall engagement surface has a T-shaped groove which extends in a longitudinal direction of the profiled catch section, wherein the T-shaped groove is open to at least one end face of the profiled catch section;

a counter catch which corresponds to said at least one catch, wherein the corresponding counter catch is arranged on a side wall of the next largest covering box;

a rear wall which extends between said first and second side walls, wherein the rear wall is joined to the profiled catch section; and at least one stop arranged on the profiled catch section, wherein the stop can be brought into contact with a profiled catch section of the next-largest covering box.

2. A cover according to claim 1, wherein the profiled catch section comprises a groove for receiving the shock-absorbing element.

3. A cover according to claim 1, wherein the shock-absorbing element extends over the entire catch surface.

4. A cover according to claim 1, wherein the shock-absorbing element comprises felt.

5. A cover according to claim 1, wherein the stop is arranged in a stop groove configured in the profiled catch section.

6. A cover for a machine bed of a machine tool, said cover comprising a plurality of covering boxes which can be pushed one inside another, wherein each covering box comprises:

first and second side walls;

a top wall connected to said first and second side walls;

at least one catch which projects outwards from a side wall for catching a next largest covering box, wherein said at least one catch is configured on a profiled catch section arranged on a side wall; and a counter catch which corresponds to said at least one catch, wherein the corresponding counter catch is arranged on a side wall of the next largest covering box, wherein the profiled catch section comprises a surface for lying on a side wall, wherein the surface for lying on a side wall has a T-shaped groove which extends in a longitudinal direction of the profiled catch section, wherein the T-shaped groove is open to at least one end face of the profiled catch section.

7. A cover according to claim 6, wherein said at least one catch comprises a catch surface on which a shock-absorbing element is arranged.

8. A cover for a machine bed of a machine tool, said cover comprising a plurality of covering boxes which can be pushed one inside another, wherein each covering box comprises:

first and second side walls;

a top wall connected to said first and second side walls;

at least one catch which projects outwards from a side wall for catching a next largest covering box, wherein said at least one catch is configured on a profiled catch section arranged on a side wall; and a counter catch which corresponds to said at least one catch, wherein the corresponding counter catch is arranged on a side wall of the next largest covering box, wherein each covering box of said plurality of covering boxes further comprises a rear wall which extends between the side walls, wherein the rear wall is joined to the profiled catch section, wherein the profiled catch section comprises a surface for lying against the rear wall, wherein the surface for lying against the rear wall has at least one T-shaped groove which extends in a longitudinal direction of the profiled catch section, wherein the at least one T-shaped groove is open to at least one end face of the profiled catch section.

9. A cover according to claim 6, further comprising at least one stop arranged on the profiled catch section, wherein the stop can be brought into contact with a profiled catch section of the next-largest covering box.

10. A cover according to claim 9, wherein the stop is arranged in a stop groove configured in the profiled catch section.

11. A cover according to claim 6, further comprising at least one stop arranged on the profiled catch section, wherein the stop can be brought into contact with a rear wall of the next-largest covering box.

12. A cover according to claim 11, wherein the stop is arranged in a stop groove configured in the profiled catch section.

13. A cover according to claim 7, wherein the shock-absorbing element comprises felt.

14. A cover according to claim 7, wherein the profiled catch section comprises a groove for receiving the shock-absorbing element.

15. A cover according to claim 7, wherein the shock-absorbing element extends over the entire catch surface.

* * * * *